M. WILSON.
Combined Transplanter and Hoe.
No. 202,909. Patented April 23, 1878.
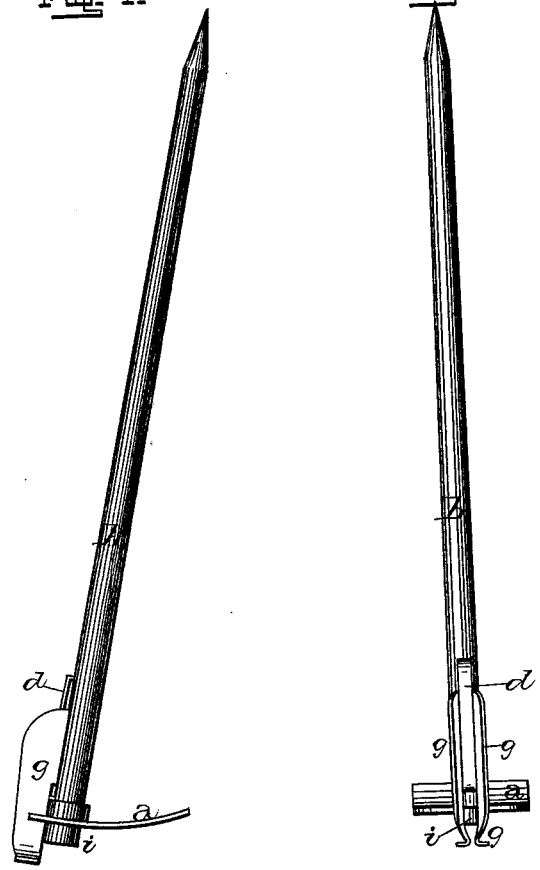
WITNESSES.
J W Garner
W. H. Kerr.
INVENTOR.
Moses Wilson
per
J. A. Lehmann,
atty.

UNITED STATES PATENT OFFICE.

MOSES WILSON, OF POCAHONTAS, ARKANSAS.

IMPROVEMENT IN COMBINED TRANSPLANTER AND HOE.

Specification forming part of Letters Patent No. 202,969, dated April 23, 1878; application filed March 5, 1878.

*To all whom it may concern:*

Be it known that I, MOSES WILSON, of Pocahontas, in the county of Randolph and State of Arkansas, have invented certain new and useful Improvements in Combined Transplanter and Hoe; and I do hereby declare the following to be a full, clear, and exact description of the invention, such as will enable others skilled in the art to which it pertains to make and use it, reference being had to the accompanying drawings, which form part of this specification.

My invention relates to a combined transplanter and hoe; and it consists in making the handle of the hoe sharp at one end, for the purpose of making the holes for the plants, and the other end of the handle made to project beyond the blade of the hoe, and attaching a plant-holding device to the back of the handle at the lower end, for the purpose of holding the plant while the earth is being pressed around it, as will be more fully described hereinafter.

The accompanying drawings represent my invention.

$a$ represents an ordinary hoe-blade, having a notch cut through its rear edge; and $b$, its handle. This handle is made sharp at its upper end, for the purpose of making holes in the ground to set the plants in, while the other end projects beyond the hoe-blade, for the purpose of pressing the earth tightly around the plant.

To the back of the handle is attached a long loop or staple, $d$, which serves as a means of attaching the vertically-sliding spring-jaws to the handle, and of opening the jaws as they are pressed upward, for the purpose of releasing the plant. These jaws $g$ are made of light spring metal, and have their lower ends turned outward, as shown, so that the plants will not be injured by the sharp edges, and so as to form a rest upon the top of the ground, and thus cause the jaws to move upward.

The operator, in setting out plants, turns the sharp end of the handle downward, and presses it into the earth. At the same time he takes a plant and inserts it between the spring-jaws, so that its roots will hang downward when the hoe is again reversed.

The roots of the plant are directed into the hole, and then the operator's foot is placed upon the hoe-blade, so as to give a suitable downward pressure to the earth around the plant.

The projecting end $i$ of the handle serves to force the earth against the roots and sides of the plant at the same time that the blade presses down the earth around the surface of the hole. As the hoe is thus forced downward by the foot, the outwardly-turned ends of the jaws $g$ come in contact with the earth and move vertically forward upon the handle. As these jaws move upward, the lower end of the loop or staple $d$ comes in between the spring portion of the jaws, and forces them outward, so as to open them, and thus cause them to release their hold upon the plant. As the hoe is then raised upward the plant will be left in the earth firmly embedded in position.

By thus combining a hoe and a transplanter, it will be readily seen that the hoe is always ready to cut away or otherwise prepare the earth, and that when not used in connection with the transplanter, the transplanter will in no wise affect its action.

Having thus described my invention, I claim—

1. The combination of the hoe-blade $a$, handle $b$, and transplanter $g$, the blade having a notch through its rear edge to allow the transplanter to move in, substantially as shown.

2. The combination of the hoe $a$, handle $b$, and transplanter $g$, one end of the handle being made sharp, and the other end made to project beyond the hoe-blade, for the purpose of pressing the earth against the plant, substantially as set forth.

In testimony that I claim the foregoing I have hereunto set my hand this 2d day of February, 1878.

MOSES WILSON.

Witnesses:
SAMUEL H. PARKER,
REUBEN WILSON.